United States Patent [19]
Bennett, Jr.

[11] 3,771,209
[45] Nov. 13, 1973

[54] PROCESS FOR RECLAIMING NON-METALLIC MATERIALS JOINED TOGETHER BY METAL FASTENERS

[76] Inventor: James H. Bennett, Jr., 151 Chesapeake Park Plaza, Baltimore, Md. 21220

[22] Filed: Oct. 10, 1972

[21] Appl. No.: 296,095

[52] U.S. Cl............... 29/403, 29/426, 29/DIG. 13, 219/10.49, 219/10.61, 219/162
[51] Int. Cl....................... B23q 17/00, B23p 19/00
[58] Field of Search....................... 29/403, DIG. 13, 29/426, 427; 219/68, 10.43, 50, 162, 10.57

[56] References Cited
UNITED STATES PATENTS

| | | | |
|---|---|---|---|
| 1,385,079 | 7/1921 | Jones | 219/50 X |
| 1,569,397 | 1/1926 | Robertson | 219/162 |
| 2,291,862 | 8/1942 | Bailey | 219/10.57 X |
| 2,513,431 | 7/1950 | Sell | 219/68 |
| 2,593,843 | 4/1952 | Cannon | 29/426 UX |
| 2,699,483 | 1/1955 | Arnolt | 219/68 |
| 3,697,715 | 10/1972 | Morris et al. | 219/10.43 |

FOREIGN PATENTS OR APPLICATIONS
577,830 6/1946 Great Britain................... 219/50

Primary Examiner—Charles W. Lanham
Assistant Examiner—D. C. Reiley, III
Attorney—John A. Crowley, Jr. et al.

[57] ABSTRACT

A process for separating non-metallic materials joined together by a metallic fastener whereby sufficient heat is generated in the metal fastener to disintegrate a portion of the material adjacent the fastener so as to disjoin the metallic fastener from the material.

This disclosure is concerned with a process for separating non-metallic material joined together by a metallic fastener and, more particularly is concerned with a process for reclaiming wood from wooden structures which are assembled by use of metallic fasteners.

18 Claims, 4 Drawing Figures

PATENTED NOV 13 1973 3,771,209

PROCESS FOR RECLAIMING NON-METALLIC MATERIALS JOINED TOGETHER BY METAL FASTENERS

BACKGROUND OF THE INVENTION

It is well known that many structures which are made of wood or other similar non-metallic materials are formed from component parts which are nailed, screwed, bolted or stapled together. Very often such structures are used for a single purpose. When that purpose is served or when the useful life of the structure is destroyed either because of damage to the structures itself or because of the advent of new or improved replacement structures, the original structure is thereupon discarded. An example of such a sructure is a common wooden storage or shipping pallet. To facilitate the transportation of specific goods from one location to another very often the manufacturer of such goods mounts them on shipping pallets to ease their transportation. When the goods are received by the user, the pallets may be either reused for shipping other goods as long as the condition of the pallets warrants their reuse. Often because of the deteriorated condition of the pallets resulting from continuous use or simply because of the economics of the situations, the pallets received from the manufacturer are simply discarded and treated as junk. The junked pallets may be burned or manually disassembled with the component parts being used as scrap lumber or the like. Because of the ecological problems associated with lumber burning such method of discard has been discouraged.

Various types of techniques are present in the prior art for disassembling non-metallic materials which have been fastened together by metal fasteners. A very common technique utilizes either manual or mechanically operated brute force to pull the metal fastener from the material. However, because of the tedious and often time consuming characteristic associated with manually disassembling the pallets, it is very often economically unprofitable to attempt to reclaim the component parts as lumber by these techniques. Further, the mechanically operated brute force devices designed to pull the fasteners from structures have not been found entirely satisfactory since such mechanical systems are ordinarily designed to disassemble only a simplified type of structure. Further, the use of such brute force techniques inevitably result in splitting the non-metallic structure, such as lumber board, from which the structure is made thereby curtailing their reuse as structural material.

Other techniques known in the art include the application of a current carrying element to metal fasteners, such as staples, which are arranged to bind a plurality of paper pages together. In such an arrangement, as typified by U.S. Pat. Nos. 2,513,431 and 2,699,483, the current carrying element is placed in direct and physical contact with the staple fastener and a current is allowed to pass into the staple until it is transformed into a metal powder thus freeing the previously bounded pages. While such a system seems to work satisfactorily, it has certain limitations. For example, since direct contact between the current carrying device and the metallic staple is required, this system could not remove staples which are not readily exposed. Also an inordinate amount of electrical energy would need to be applied to those metallic fasteners which are quite large in dimension, such as spikes, nails, bolts, screws, rivets and the like, in order to melt them. Further, proper shielding would be necessitated to insure against the risk that an operator might become splashed by the molten metal produced as the result of the melting of such large fastening elements. Still further, the high temperatures needed to melt the large metal fasteners and transform them into a liquid or powder form might tend to set fire to the non-metallic structure, such as paper or wood, and thus require periodic extinguishment.

Some other techniques, such as those typified in U.S. Pat. No. 1,569,397, are contained in the prior art and are directed to processes for separating metal straps or fasteners which are bonded to non-metallic materials. In these processes the non-metallic materials present near the metal fasteners are melted in order to loosen the bond between the metal fasteners and non-metallic materials; accordingly, these techniques are limited to separating non-metallic materials which are only capable of being melted. Further, sufficient clearance is not produced between the metal fasteners and the non-metallic materials to effect a trouble-free separation.

It is an object of this invention to provide a simplified and efficient process of separating non-metallic materials joined together by a metal fastener and more particularly, to provide a process that is capable of continuously reclaiming wood from wooden structures made up of wooden component parts being joined together by metal fasteners. Other objects will become apparent to those skilled-in-the-art from an inspection of the description hereinafter set forth.

STATEMENT OF THE INVENTION

In accordance with certain of its aspects, the novel process of this invention for separating non-metallic materials joined together by a metal fastener may comprise selectively heating the fastener to increase its temperature; maintaining the temperature of the fastener at a temperature sufficient only to disintegrate a portion of the materials immediately adjacent to the fastener; and segregating the materials from the fastener.

DESCRIPTION OF THE INVENTION

Generally speaking, the structures to which this invention relates may comprise materials which may be joined together by any well known type of metal fasteners. Such fasteners may include spikes, nails, screws, bolts, rivets etc., being made of a variety of materials such as steel, aluminum, brass, etc.

The particular type of material of the structure that may be treated in accordance with this invention may be varied but it should be of a type such that it will be less electrically and thermally conductive than the metallic fasteners themselves. Also, the structural material should be one that may be capable of being burned, disintegrated or otherwise removed by the application of localized heat. Preferably the structural material may be a cellulosic material such as wood, paper, plastic and the like.

In the practice of this novel process non-metallic structural material, being held together by metal fasteners, may be heated such that only the temperature of the metal fasteners may be generally affected. Such selected heating may be accomplished by any suitable heat source, typically an inductive heating device, or the like.

The metallic fasteners may be heated until the temperature of the metallic fasteners is sufficiently high to cause a portion of the structural material immediately adjacent to and surrounding this metallic fastener to disintegrate.

The disintegration of the structural material is allowed to continue until sufficient material has been removed to provide a clearance between the metal fasteners and the structural material. The metallic fastener is thereby sufficiently loosened from its fixed position in the structural material so that the metallic fastener may be easily freed from contact with the structural material. It is difficult to specify the exact degree of heat that may be necessary to successfully remove enough structural material to satisfactorily free the metallic fastener from the structural material since the selection would be dependent upon the exact nature (including the size, shape and chemical make-up) of both the metallic fasteners and structural materials. It sufficies to say that the heat of the metallic fasteners must be such that a sufficient portion of the structural material may be removed from the immediate area about the metallic fastener so that the metallic fastener may become loosened and freed and thereby either fall from its original joining position or be easily pulled thereapart by the application of a minimum force.

In order to aid in the separation of the metallic fasteners from the structural material subsequent to the heating operation, this invention also contemplates the step of vibrating the structural material. Any common and well known vibrating mechanism, such as a vibrating platform, may be utilized to accomplish this purpose. Further, to facilitate the orderly separation of the above, it is contemplated that the metallic fasteners and structural material may be exposed to a magnetic field produced by a suitable magnet means, such as a permanent magnet or electro magnet. The metallic fasteners which have been previously loosened by the vibrating operation may be attracted by the magnetic field of the magnet and thereby efficiently separated from the structural material.

It is a particular feature of the process of this invention that structural material may be easily and efficiently disassembled so that the structural component parts may be substantially left in tact and thereby reusable. In the case of wooden structures, the component parts thereof may find usefulness for any number of building purposes as lumber material. Alternatively, because the metal fasteners have been removed, such lumber may be more economically physically transformed into wood chips for making paper, carton board or other similar products.

It is emphasized that the process of this invention provides a system for dismantling wooden, or like structures, in a way which does not involve the application of excessive brute force and which thereby does not damage to any substantial extent the structural component parts thereby enabling full and effective reuse to be made of the such parts.

DESCRIPTION OF THE PREFERRED EMBODIMENT

Figure 1:
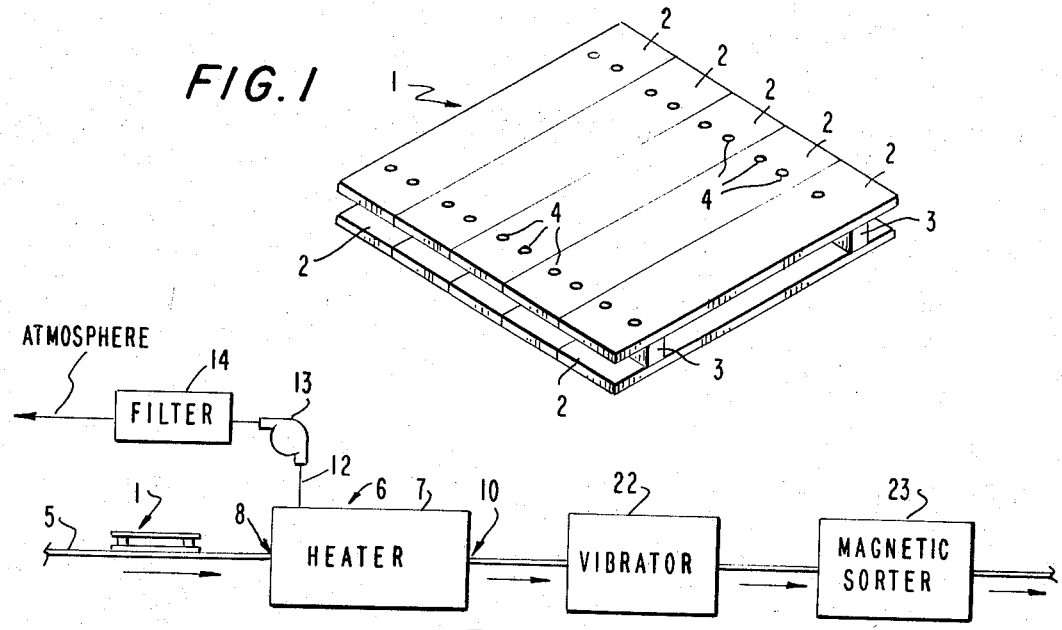
FIG. 1 is a prospective view of a pallet which may be treated in accordance with the process of this invention.

Referring now to the FIG. 1 of the drawings, the wooden pallet, generally indicated by 1, may comprise a plurality of flat elongated boards 2 arranged adjacent to one another in at least two groups so that the planar surfaces of one group are parallel to the others. A pair of crosspieces 3 are positioned between the two parallel groups of boards 2. The boards 2 and the crosspieces 3 are held in a fixed position by the nails 4.

Figure 2:
FIG. 2 is a schematic view of the process of this invention.
Figure 3:
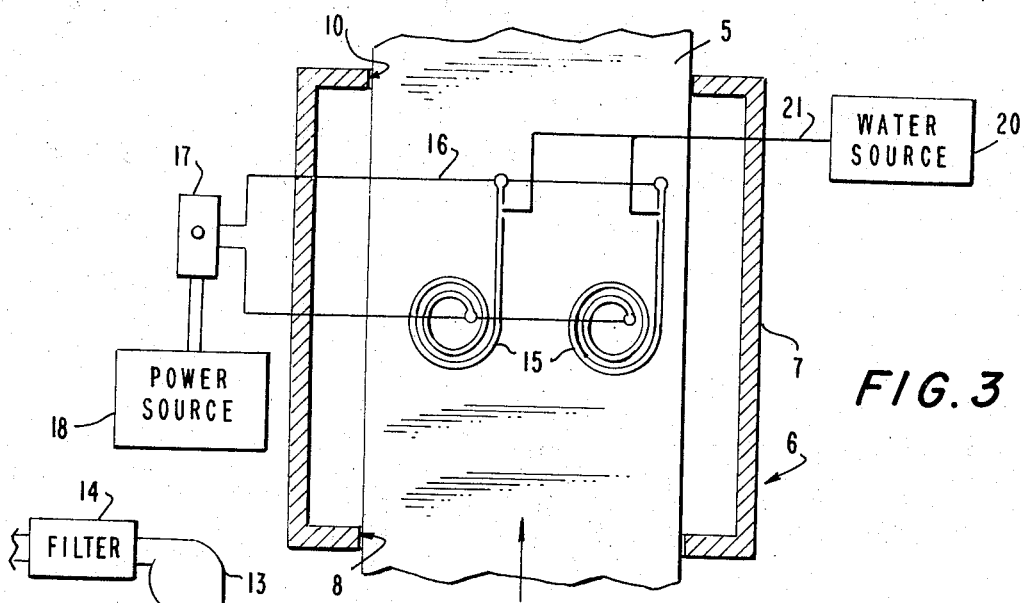
FIG. 3 is a plan view in cross-section of the heater of this invention.
Figure 4:
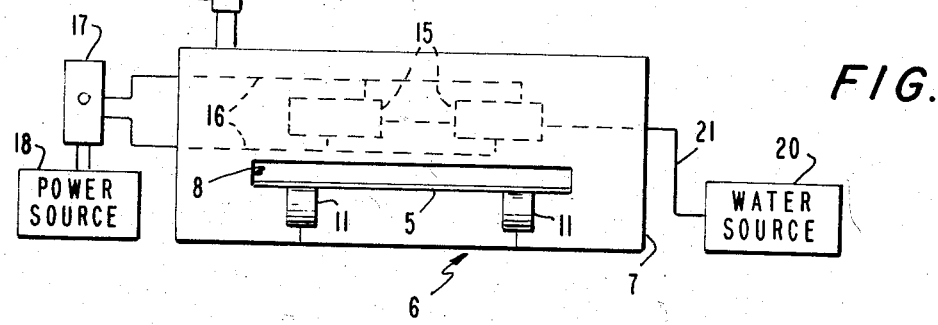
FIG. 4 is an end view showing the inlet end of the heater.

As shown in FIG. 2, the pallet 1 may be carried by a conveyor belt 5 which may be continuously moved by a motor source not shown.

A heater, generally indicated by 6, may be provided within an enclosed housing 7. The housing 7 may carry a material inlet 8 and a material outlet 10 through which the conveyor belt 5 may be adapted to move. The conveyor belt 5 may move within the housing 7 over a group of rollers 11 which may be positioned within the housing 7.

An exhaust duct 12 may be arranged to project upwardly from the upper surface of the housing 7 to provide communication with the atmosphere. The exhaust duct 12 may be provided with an exhaust fan 13 and a filter 14.

Two tubular induction coils 15 may be situated within the housing 7 at locations above the moving belt 5. These coils 15 may be electrically connected through connecting wires 16 to a switch 17, positioned outside the housing 7. The switch 17, in turn, may be electrically connected to a power source 18 which provides suitable current, such as alternating current, to the coils 15.

The coils 15 may also be provided with a cooling system to prevent their becoming overheated. The cooling system may comprise a water source 20 which may be located outside the housing 7. A cooling conduit 21 may be arranged to provide communication between the cooling source 20 and the interior of the tubular coils 15.

In the practice of the process of this invention the pallets 1 may be placed upon the moving conveyor belt 5 and may be transported to the heater 6. As the pallet may move into the heater 6, the switch 17 may be activated thereby transmitting alternating current between the power source 18 and the induction coils 15 through connecting wire 16. The movement of the current through the coils 15 may produce a magnetic field about the pallet moving on the conveyor belt 5 through the heater 6 and it thereby sets up a current-inducing zone in the housing 7. This magnetic field defined in the current-inducing zone may induce a current to flow through the metallic fasteners 4 in the pallet 1. The current passing through the fasteners 4 may act to heat them in the current-inducing zone. As the pallet 1 may pass through this current-inducing zone, the temperature of the metallic fasteners 4 may increase until a portion of the pallet 1 immediately adjacent the metallic fasteners 4 begins to disintegrate. The temperature of the fasteners 4 may thereafter be maintained until a sufficient amount of wood is charred or disintegrated so as to substantially free the wood from the metallic fasteners 4.

Any gases or combustion products resulting from the burning of the wood in the housing 7 may be withdrawn therefrom through exhaust duct 12 by exhaust fan 13. Prior to exhausting the entrained gases to the atmosphere, they may be passed through a filter 14 where the particulate combustion products are removed.

To prevent the coils 15 from being overheated, cooling water from the cooling source 20 may be routed through the cooling conduit 21 to the interior of the tubular coils 15.

After this heat treatment operation, the pallets may be easily pulled apart by hand. In accordance with the teachings of this invention the nails may thereby either fall out or they may be easily pulled out with an operator's fingers.

Alternatively, the treated pallet may be subject to a vibrating action in a vibrator 22. This vibration of the pallets may aid in the dislodging of the wooden component parts of the pallet 1 from the metallic fasteners 4. Further, any ferro-metallic type fasteners 4 may be sorted and separated from the wooden components of the pallet 1 by thereafter subjecting the treated pallets 1 to a magnetic field from a magnet 23 as shown schematically in FIG. 2.

Having described the invention with particular reference to the preferred form thereof, it will be obvious to those skilled-in-the-art to which this invention pertains, after understanding the invention, that various changes and modifications may be made therein without departing from the spirit and scope of the invention, as defined in the following claims.

I claim:

1. A process for separating non-metallic cellulosic materials joined together by at least one metallic fastener, said process comprising selectively heating the fastener to increase its temperature; maintaining the temperature of the fastener at a temperature sufficient only to disintegrate a portion of the materials immediately adjacent to the fastener; and segregating the materials from the fastener.

2. The process of claim 1 wherein the heat is generated by induction.

3. The process of claim 1 including the step of vibrating the materials after said portion of materials is disintegrated.

4. The procss of claim 1 wherein the fastener is segregated from the materials by subjecting them to a magnetic field whereby the fastener is attracted and separated from the materials.

5. The process of claim 1 wherein the materials are paper.

6. The process of claim 2 wherein the materials are wood.

7. The process of claim 6 wherein the wood materials are shipping pallets.

8. A process of separating non-metallic cellulosic materials, which materials are joined together by at least one metallic fastener, said process comprising selectively inducing a current to flow through the fastener to increase its temperature; maintaining the flow of current through the fastener until its temperature is raised to a point sufficient only to disintegrate a portion of the materials immediately adjacent to the fastener; and segregating the materials from the fastener.

9. The process of claim 8 wherein an alternating current is induced into the fastener.

10. The process of claim 8 including the step of vibrating the materials after said portion of materials is disintegrated.

11. The process of claim 8 wherein the fastener is segregated from the materials by subjecting them to a magnetic field whereby the fastener is attracted and separated from the materials.

12. The process of claim 8 wherein the materials are paper.

13. The process of claim 8 wherein the materials are wood.

14. The process of claim 13 wherein the wood materials are pallets.

15. A process for continuously reclaiming wood from wooden structures composed of wooden components being joined by at least on fero-metallic fastener, said process comprising:
   a. transporting the structures to a current-inducing zone;
   b. passing the structures through the zone to selectively induce a current to flow through the fastener to selectively heat the fastener;
   c. maintaining the flow of current through the fastener until its temperature is raised to a point sufficient to combustively decompose a portion of the wooden components immediately adjacent to the fastener; and
   d. segregating the wood from the fastener.

16. The process of claim 15 including the step of vibrating the structures after said portion of wood is decomposed.

17. The process of claim 15 wherein the fastener is segregated from the wood by subjecting it to a magnetic field whereby the fastener is attracted and separated from the wood.

18. The process of claim 15 wherein any gases or combustion products are exhausted from the zone and thereafter filtered.

* * * * *